(12) United States Patent
Marler et al.

(10) Patent No.: US 9,730,530 B2
(45) Date of Patent: Aug. 15, 2017

(54) WIRE GRID SECURITY ENCLOSURE WITH HEAVY DUTY LATCH MECHANISM

(71) Applicants: Jon R Marler, Syracuse, IN (US); John L Earnest, Marion, IN (US)

(72) Inventors: Jon R Marler, Syracuse, IN (US); John L Earnest, Marion, IN (US)

( * ) Notice: Subject to any disclaimer, the term of this patent is extended or adjusted under 35 U.S.C. 154(b) by 0 days.

(21) Appl. No.: 15/360,843

(22) Filed: Nov. 23, 2016

(65) Prior Publication Data

US 2017/0071362 A1    Mar. 16, 2017

Related U.S. Application Data

(63) Continuation-in-part of application No. 14/985,135, filed on Dec. 30, 2015, and a continuation-in-part of application No. 14/816,357, filed on Aug. 3, 2015, now abandoned, and a continuation-in-part of
(Continued)

(51) Int. Cl.
| | |
|---|---|
| *A47K 1/04* | (2006.01) |
| *A47F 3/00* | (2006.01) |
| *E05C 5/00* | (2006.01) |
| *E05C 19/00* | (2006.01) |
| *E06B 11/02* | (2006.01) |
| *A47B 55/02* | (2006.01) |
| *A47F 3/14* | (2006.01) |
| *A47F 5/10* | (2006.01) |
| *A47F 5/13* | (2006.01) |

(Continued)

(52) U.S. Cl.
CPC .............. *A47F 3/002* (2013.01); *A47B 55/02* (2013.01); *A47B 91/002* (2013.01); *A47F 3/145* (2013.01); *A47F 3/147* (2013.01); *A47F 5/108* (2013.01); *A47F 5/137* (2013.01); *B62B 3/002* (2013.01); *E05C 5/00* (2013.01); *E05C 19/003* (2013.01); *E06B 11/021* (2013.01)

(58) Field of Classification Search
CPC .......... A47F 3/002; A47F 3/145; A47F 3/147; A47F 5/108; A47F 5/137; A47B 55/02; A47B 91/002; B62B 3/002; E05C 5/00; E05C 19/003; E06B 11/021
USPC .......... 248/129, 153, 175, 302; 108/59, 107; 211/181.1, 187
See application file for complete search history.

(56) References Cited

U.S. PATENT DOCUMENTS

| | | | | |
|---|---|---|---|---|
| 3,007,708 | A | * | 11/1961 | Ochs ...................... A47B 55/02 108/107 |
| 3,288,484 | A | * | 11/1966 | Brunette ................. B62B 3/004 16/345 |

(Continued)

*Primary Examiner* — Gwendolyn Baxter

(57) ABSTRACT

A wire grid security enclosure with heavy duty latch mechanism is utilized to secure contents while allowing viewing of the contents within. The enclosure includes a base mount onto which a lateral wall is positioned. The enclosure includes an upper panel that closes the top portion of the lateral wall as well as a first door and a second door that are opened to gain access to the enclosure. The first door and the second door are prevented from opening by a first hooked rod and a second hooked rod. The first hooked rod and the second hooked rod are removably engaged to the upper panel as well as to the first door and the second door. The first hooked rod and the second hooked rod connect via a first locking tab and a second locking tab that are positioned on the first hooked rod and the second hooked rod.

16 Claims, 6 Drawing Sheets

Related U.S. Application Data application No. 14/702,483, filed on May 1, 2015, now Pat. No. 9,387,954.

(60) Provisional application No. 62/260,157, filed on Nov. 25, 2015, provisional application No. 62/098,124, filed on Dec. 30, 2014, provisional application No. 62/031,912, filed on Aug. 1, 2014, provisional application No. 61/987,309, filed on May 1, 2014.

(51) Int. Cl.
*A47B 91/00* (2006.01)
*B62B 3/00* (2006.01)

(56) References Cited

U.S. PATENT DOCUMENTS

| | | | | |
|---|---|---|---|---|
| 3,861,554 | A * | 1/1975 | Legg | B65D 19/10 217/43 A |
| 4,067,444 | A * | 1/1978 | Wilson | B62B 3/002 211/126.15 |
| 5,797,487 | A * | 8/1998 | Young | G11B 33/0405 206/307 |
| 6,663,139 | B1 * | 12/2003 | Smith | B62B 3/002 280/651 |
| 6,811,163 | B1 * | 11/2004 | Gurule | B62B 3/002 280/79.3 |
| 2016/0348401 | A1 * | 12/2016 | Veness | E05B 65/5207 |

* cited by examiner

DETAIL A

DETAIL B

DETAIL C

WIRE GRID SECURITY ENCLOSURE WITH HEAVY DUTY LATCH MECHANISM

The current application claims a priority to the U.S. Provisional Patent application Ser. No. 62/260,157 filed on Nov. 25, 2015.

FIELD OF THE INVENTION

The present invention relates generally to a security enclosure. More specifically, the present invention is a wire grid security enclosure with heavy duty latch mechanism that enables secure viewing of contents within.

BACKGROUND OF THE INVENTION

Wire grid enclosures are often utilized for a wide variety of applications. Most often, wire grid enclosures are utilized when it is necessary to secure products or goods to prevent theft while still allowing the products or goods to be visible. Wire grid enclosures generally include multiple walls as well as one or more doors that may be opened in order to gain access to the interior of the enclosures. A common problem that is inherent to these types of wire grid enclosures is the relative ease with which it is possible to bend the doors in order to gain access to the contents within the enclosures without opening the doors.

The present invention is a wire grid security enclosure with heavy duty latch mechanism. The present invention provides increased security to the contents within the enclosure without compromising the ability to easily view the contents of the enclosure. The heavy duty latch mechanism prevents the enclosure's doors from being opened in a normal manner.

DETAIL DESCRIPTIONS OF THE INVENTION

Figure 1:
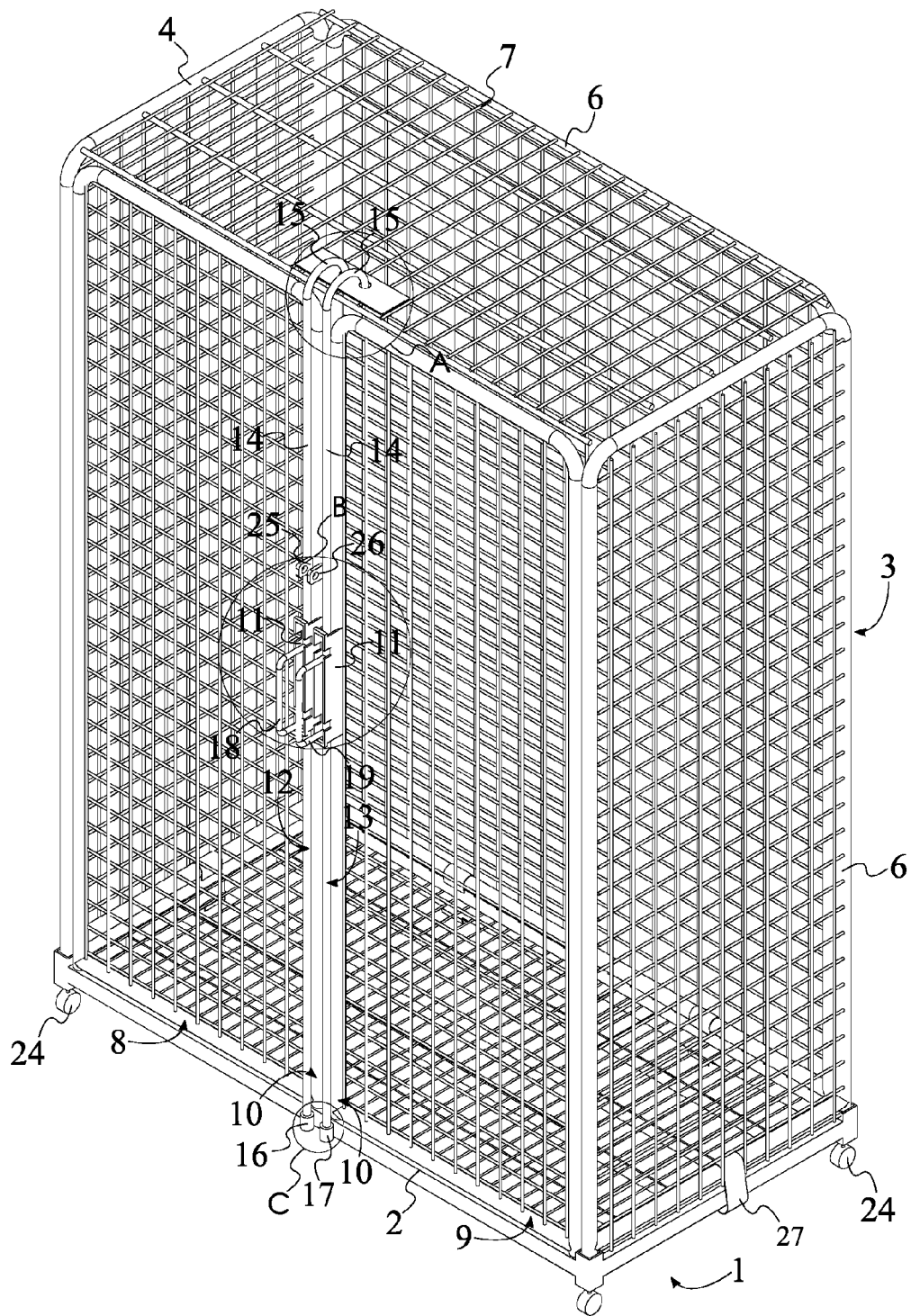
FIG. 1 is a perspective view of the present invention in a closed configuration.
Figure 2:
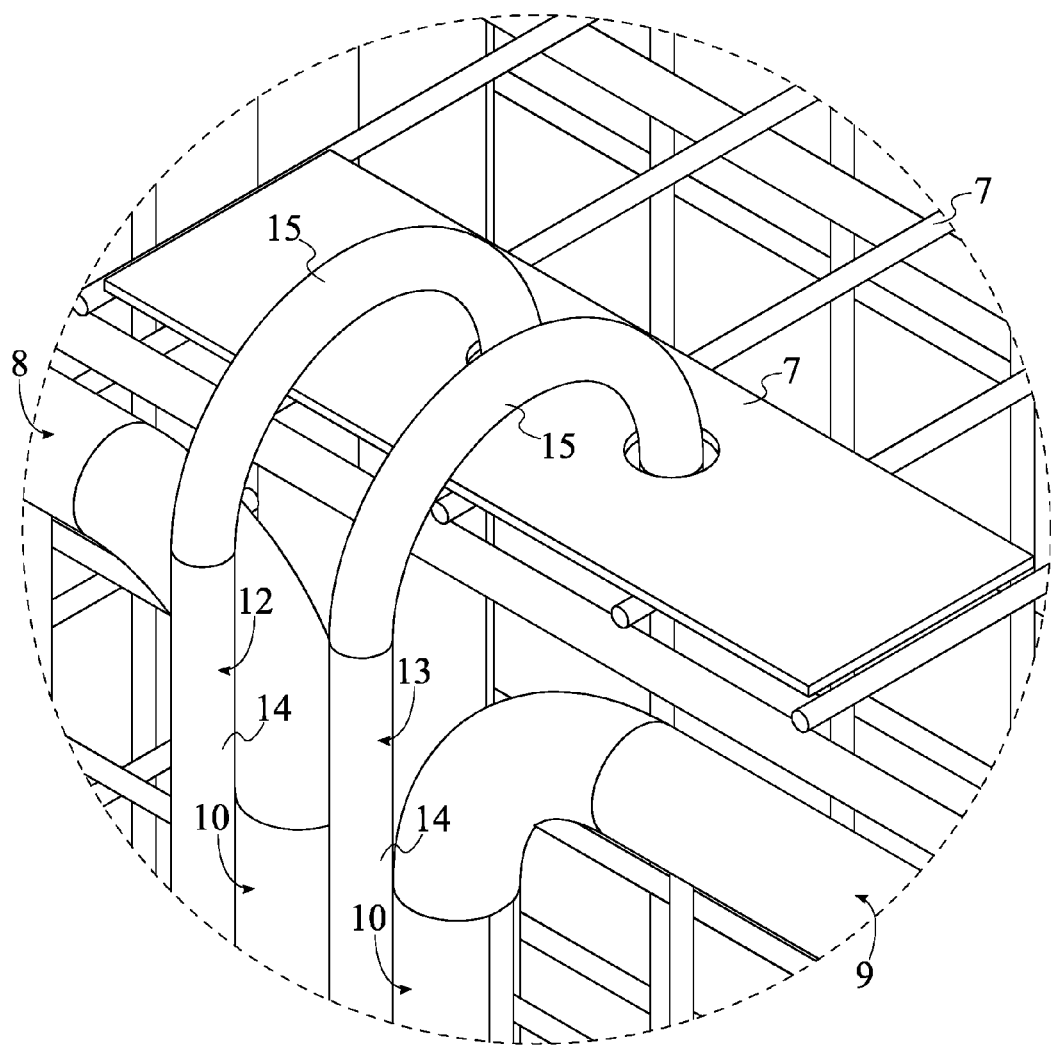
FIG. 2 is a detail view of the present invention taken from circle A of FIG. 1.
Figure 3:
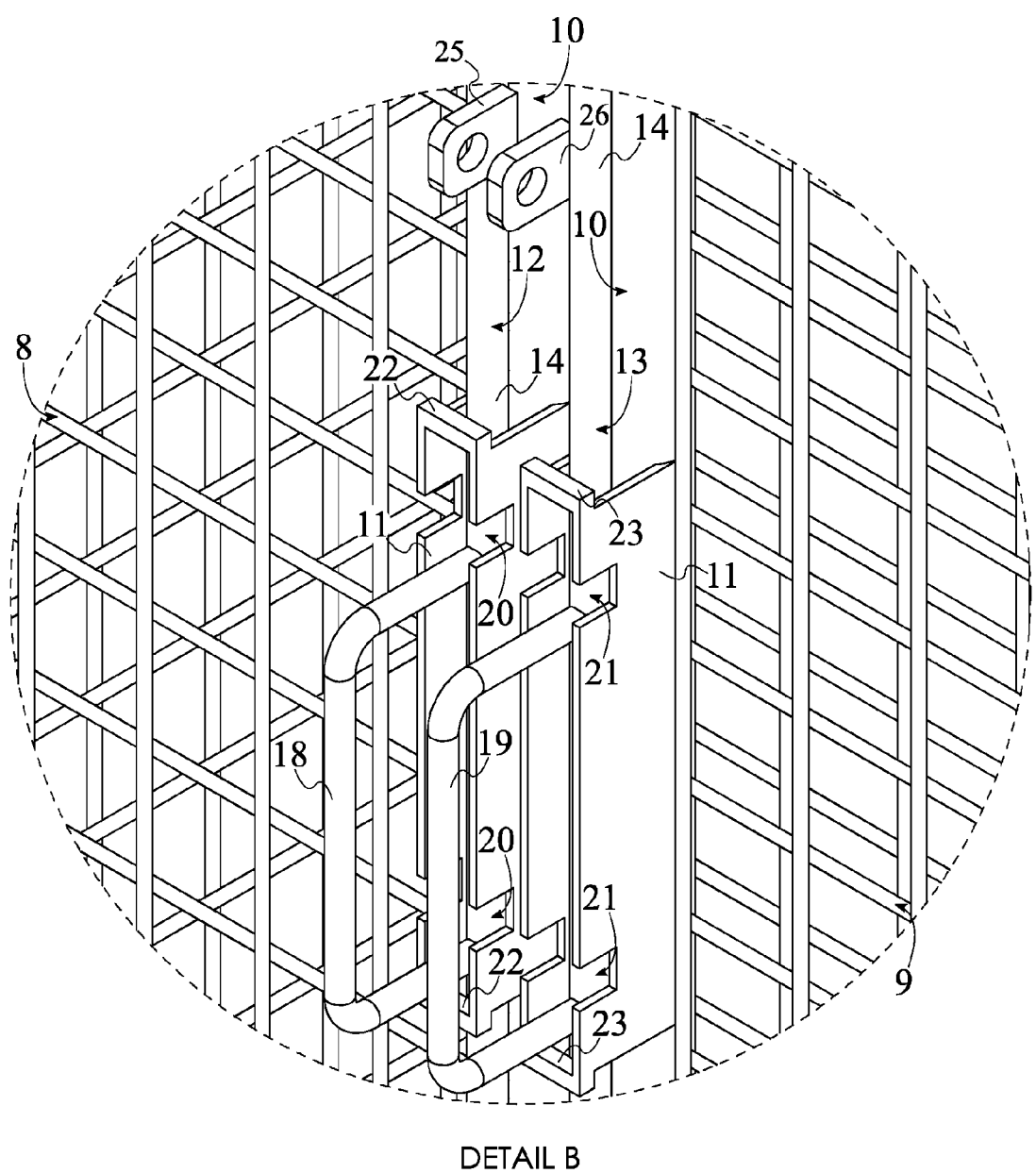
FIG. 3 is a detail view of the present invention taken from circle B of FIG. 1.
Figure 4:
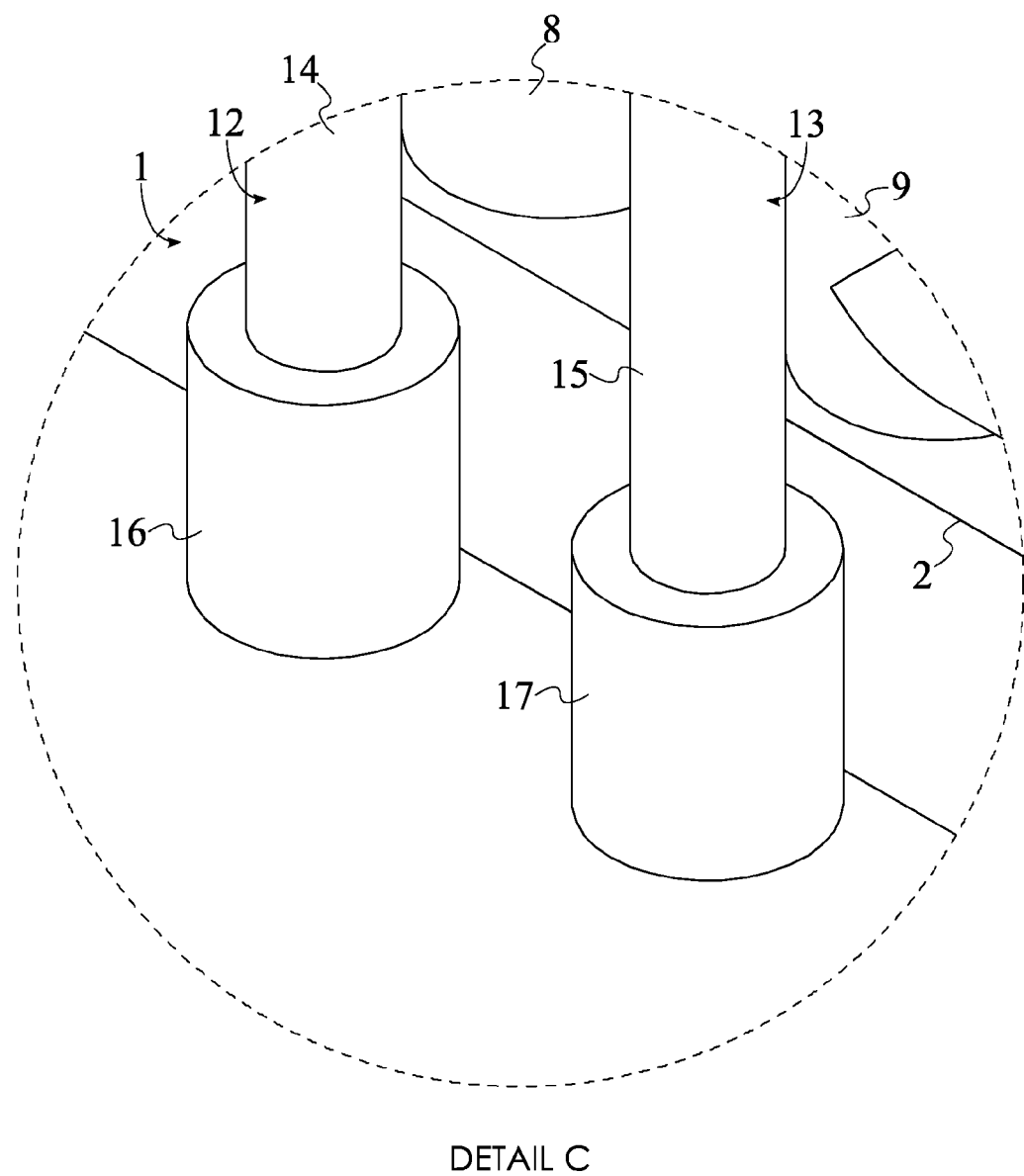
FIG. 4 is a detail view of the present invention taken from circle C of FIG. 1.
Figure 5:
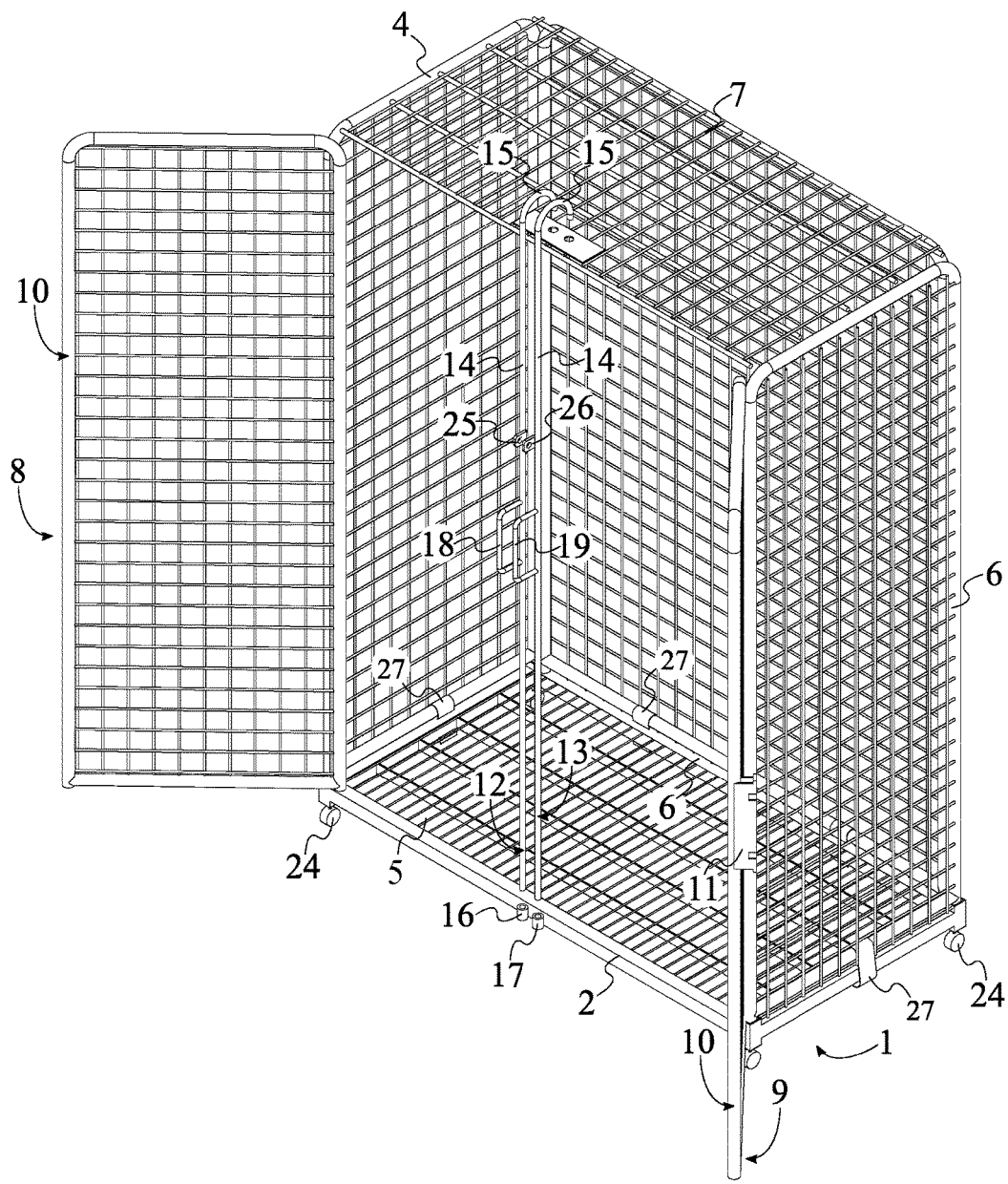
FIG. 5 is a perspective view of the present invention in an open configuration.

All illustrations of the drawings are for the purpose of describing selected versions of the present invention and are not intended to limit the scope of the present invention.

The present invention is a wire grid security enclosure with heavy duty latch mechanism. The present invention is shown in FIGS. 1-5 and comprises a base mount 1, a lateral wall 3, an upper panel 7, a first door 8, a second door 9, a first hooked rod 12, and a second hooked rod 13.

The base mount 1 serves as a foundation for the present invention onto which the lateral wall 3 is positioned. The lateral wall 3 is perimetrically connected around the base mount 1, forming a portion of the enclosure of the present invention. The lateral wall 3 comprises a first panel 4, a second panel 5, and a third panel 6 that form three portions of the lateral wall 3. The first panel 4 and the third panel 6 are oriented parallel to each other, forming two oppositely positioned "side" portions of the lateral wall 3 on the base mount 1. The second panel 5 is oriented perpendicular to the first panel 4 and to the third panel 6, forming a "rear" portion of the lateral wall 3 on the base mount 1. The upper panel 7 forms a "lid" for the present invention and is connected to the lateral wall 3, opposite to the base mount 1. The upper panel 7 is thus able to cover the uppermost portion of the lateral wall 3.

The present invention further includes a plurality of clips 27. Each of the plurality of clips is utilized to secure the lateral wall 3 to the base mount 1, wherein each of the plurality of clips 27 is engaged with the lateral wall 3 and the base mount 1. In the preferred embodiment of the present invention, the plurality of clips 27 is specifically 4 clips. A first clip is engaged with the first panel 4 and the base mount 1, a second clip and a third clip are engaged with the second panel 5 and the base mount 1, and a fourth clip is engaged with the third panel 6 and the base mount 1.

Figure 6:
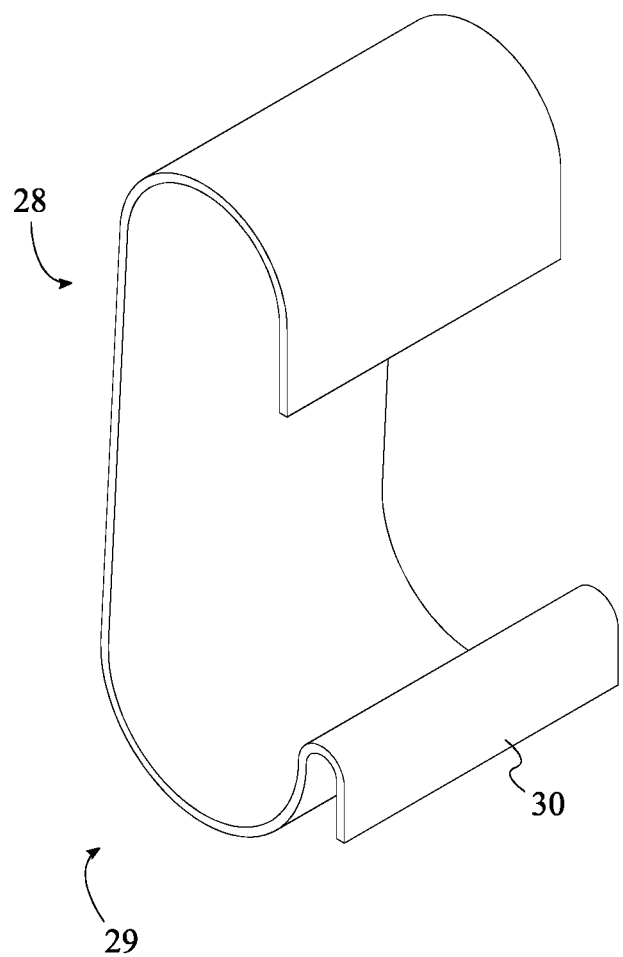
FIG. 6 is a perspective view of one of the plurality of clips.

Furthermore, in the preferred embodiment of the present invention, each of the plurality of clips 27 has a first curved portion 28, a second curved portion 29, and a tab 30 as depicted in FIG. 6. The first curved portion 28 is configured to be fitted around the bottom of the lateral wall 3, while the second curved portion 29 is configured to be fitted around the base mount 1. The tab 30 is adjacently connected to the second curved portion 29 and allows the clip to be fitted in place or removed. To install each of the plurality of clips 27, the first curved portion 28 is first fitted around the lateral wall 3. Each of the plurality of clips 27 is then rotated downwards, towards the base mount 1, wherein the second curved portion 29 is fitted around the base mount 1; each of the plurality of clips 27 being snapped into place.

The first door 8 and the second door 9 are utilized to close the enclosure formed by the lateral wall 3 and the upper panel 7. The first door 8 and the second door 9 are pivotally connected to the base mount 1 in between the first panel 4 and the third panel 6 in order to prevent access to the interior of the enclosure. The first door 8 and the second door 9 are positioned opposite to the second panel 5 across the base mount 1, allowing the first door 8 and the second door 9 to close the open portion of the enclosure formed by the lateral wall 3 and the upper panel 7.

The first hooked rod 12 and the second hooked rod 13 are utilized to lock the first door 8 and the second door 9 in order to prevent the first door 8 and the second door 9 from being opened. The first hooked rod 12 and the second hooked rod 13 are respectively engaged to the first door 8 and the second door 9, preventing access to the interior of the enclosure. The first hooked rod 12 and the second hooked rod 13 are also removably engaged to the upper panel 7, preventing the first door 8 and the second door 9 from being opened. The first hooked rod 12 and the second hooked rod 13 may be disengaged from the upper panel 7 in order to allow the first door 8 and the second door 9 to be opened.

An open edge 2 of the base mount 1 is delineated by the first panel 4 and the third panel 6. The open edge 2 may be closed by the first door 8 and the second door 9 and is positioned opposite to the second panel 5 across the base mount 1. The open edge 2 is thus positioned adjacent to the open portion of the enclosure formed by the lateral wall 3 and the upper panel 7. The first door 8 is pivotally connected to the open edge 2, adjacent to the first panel 4 while the second door 9 is pivotally connected to the open edge 2, adjacent to the third panel 6. The first door 8 and the second door 9 are thus able to close the open edge 2 in order to prevent access to the interior of the enclosure.

The present invention further comprises a first retaining loop 16 and a second retaining loop 17. The first retaining loop 16 and the second retaining loop 17 are utilized to secure the first hooked rod 12 and the second hooked rod 13 when the enclosure is locked to prevent the first hooked rod 12 and the second hooked rod 13 from being separated from the first door 8 and the second door 9. The first retaining loop 16 and the second retaining loop 17 are positioned on the open edge 2, positioning the first retaining loop 16 and the second retaining loop 17 adjacent to the first door 8 and the second door 9 when the first door 8 and the second door 9 are closed. The first hooked rod 12 is removably engaged through the first retaining loop 16 while the second hooked rod 13 is removably engaged through the second retaining loop 17. The first hooked rod 12 and the second hooked rod 13 may thus be inserted into the first retaining loop 16 and the second retaining loop 17 in order to secure the first hooked rod 12 and the second hooked rod 13.

In the preferred embodiment of the present invention, the first hooked rod 12 and the second hooked rod 13 each comprise an elongated portion 14 and a hooked portion 15. The hooked portion 15 is terminally connected to the elongated portion 14, forming the single body first hooked rod 12 and second hooked rod 13. The hooked portion 15 is removably engaged to the upper panel 7, enabling the first hooked rod 12 and the second hooked rod 13 to be secured to the upper panel 7. The first hooked rod 12 and the second hooked rod 13 may be disengaged from the upper panel 7 by raising the first hooked rod 12 and the second hooked rod 13.

The first door 8 and the second door 9 each comprise an inner edge 10 and a sleeve 11. The inner edge 10 of the first door 8 is the edge that is oriented toward the second door 9 while the inner edge 10 of the second door 9 is the edge that is oriented toward the first door 8. The sleeve 11 provides a guide for the first hooked rod 12 and the second hooked rod 13 when the first hooked rod 12 and the second hooked rod 13 are moved in an upward or downward direction. The sleeve 11 is medially positioned on the inner edge 10, enabling the sleeve 11 to guide and retain the elongated portion 14 of both the first hooked rod 12 and the second hooked rod 13. The elongated portion 14 of the first hooked rod 12 is slidably and rotatably engaged through the sleeve 11 of the first door 8. Similarly, the elongated portion 14 of the second hooked rod 13 is slidably and rotatably engaged through the sleeve 11 of the second door 9. The first hooked rod 12 and the second hooked rod 13 may thus be engaged with or disengaged from the upper panel 7 by sliding the first hooked rod 12 and the second hooked rod 13 in an upward or downward direction. The first hooked rod 12 is slidably and rotatably engaged through the sleeve 11 of the first door 8 while the second hooked rod 13 is slidably and rotatably engaged through the sleeve 11 of the second door 9, allowing quick engagement and disengagement with the upper panel 7.

The present invention further comprises a first handle 18 and a second handle 19. The first handle 18 and the second handle 19 improve user leverage when engaging or disengaging the first hooked rod 12 and the second hooked rod 13 with the upper panel 7. The first handle 18 is medially positioned on the first hooked rod 12 while the second handle 19 is medially positioned on the second hooked rod 13, allowing the user to conveniently grasp the first handle 18 and the second handle 19.

The present invention further comprises a first set of handle slots 20 and a second set of handle slots 21. The first set of handle slots 20 and the second set of handle slots 21 allow the first handle 18 and the second handle 19 to be rotated in order to enable the first door 8 and the second door 9 to be easily opened when the present invention is unlocked. The first set of handle slots 20 traverses into the sleeve 11 of the first door 8 while the second set of handle slots 21 traverses into the sleeve 11 of the second door 9. The first set of handle slots 20 and the second set of handle slots 21 thus form openings in the sleeve 11 of the first door 8 and the sleeve 11 of the second door 9 into which the first handle 18 and the second handle 19 may be positioned.

The present invention further comprises a first set of retaining tabs 22 and a second set of retaining tabs 23. The first set of retaining tabs 22 and the second set of retaining tabs 23 prevent the first hooked rod 12 and the second hooked rod 13 from separating from the channel of the first door 8 and the channel of the second door 9. The first set of retaining tabs 22 is terminally connected to the sleeve 11 of the first door 8 while the second set of retaining tabs 23 is terminally connected to the sleeve 11 of the second door 9. As a result, the first handle 18 and the second handle 19 eventually come into contact with the first set of retaining tabs 22 and the second set of retaining tabs 23 when moved in the upward or downward directions. This prevents the first hooked rod 12 and the second hooked rod 13 from being completely separated from the channel of the first door 8 and the channel of the second door 9 when the present invention is locked.

The present invention is intended for use with a locking device such as a padlock. As a result, the present invention further comprises a first locking tab 25 and a second locking tab 26. The first locking tab 25 is positioned on the inner edge 10 of the first door 8, adjacent to the sleeve 11. Similarly, the second locking tab 26 is positioned on the inner edge 10 of the second door 9, adjacent to the sleeve 11. The first locking tab 25 and the second locking tab 26 may be secured together via a padlock or similar locking device in order to prevent the first door 8 and the second door 9 from being opened. Locking the first locking tab 25 and the second locking tab 26 together also prevents the first hooked rod 12 and the second hooked rod 13 from being separated, preventing the first door 8 and the second door 9 from being opened.

The present invention may be stationary or designed for mobility. As such, the present invention further comprises a plurality of wheels 24. The plurality of wheels 24 is removably mounted to the base mount 1, opposite to the lateral wall 3, the first door 8, and the second door 9. The plurality of wheels 24 may thus be utilized to transport the present invention along a flat surface.

Although the present invention has been explained in relation to its preferred embodiment, it is understood that many other possible modifications and variations can be made without departing from the spirit and scope of the present invention as hereinafter claimed.

What is claimed is:

1. A wire grid security enclosure with heavy duty latch mechanism comprises:
   a base mount;
   a lateral wall;
   an upper panel;
   a first door;
   a second door;
   a first hooked rod;
   a second hooked rod;
   the lateral wall comprises a first panel, a second panel, and a third panel;
   the lateral wall being perimetrically connected about the base mount;

the first panel and the third panel being oriented parallel to each other;

the second panel being oriented perpendicular to the first panel and to the third panel;

the upper panel being connected to the lateral wall, opposite to the base mount;

the first door and the second door being pivotally connected to the base mount in between the first panel and the third panel;

the first door and the second door being positioned opposite to the second panel across the base mount;

the first hooked rod and the second hooked rod being respectively engaged to the first door and the second door; and the first hooked rod and the second hooked rod being removably engaged to the upper panel.

2. The wire grid security enclosure with heavy duty latch mechanism as claimed in claim 1 further comprises:

an open edge of the base mount being delineated by the first panel and the third panel;

the open edge being positioned opposite to the second panel across the base mount;

the first door being pivotally connected to the open edge, adjacent to the first panel; and the second door being pivotally connected to the open edge, adjacent to the third panel.

3. The wire grid security enclosure with heavy duty latch mechanism as claimed in claim 2 further comprises:

a first retaining loop;

a second retaining loop;

the first retaining loop and the second retaining loop being positioned on the open edge;

the first hooked rod being removably engaged through the first retaining loop; and the second hooked rod being removably engaged through the second retaining loop.

4. The wire grid security enclosure with heavy duty latch mechanism as claimed in claim 1 further comprises:

the first hooked rod and the second hooked rod each comprise an elongated portion and a hooked portion;

the hooked portion being terminally connected to the elongated portion; and the hooked portion being removably engaged to the upper panel.

5. The wire grid security enclosure with heavy duty latch mechanism as claimed in claim 4 further comprises:

the first door and the second door each comprise an inner edge and a sleeve;

the sleeve being medially positioned on the inner edge;

the elongated portion of the first hooked rod being slidably and rotatably engaged through the sleeve of the first door; and the elongated portion of the second hooked rod being slidably and rotatably engaged through the sleeve of the second door.

6. The wire grid security enclosure with heavy duty latch mechanism as claimed in claim 1 further comprises:

the first door and the second door each comprise an inner edge and a sleeve;

the sleeve being medially positioned on the inner edge;

the first hooked rod being slidably and rotatably engaged through the sleeve of the first door; and the second hooked rod being slidably and rotatably engaged through the sleeve of the second door.

7. The wire grid security enclosure with heavy duty latch mechanism as claimed in claim 6 further comprises:

a first handle; and the first handle being medially positioned on the first hooked rod.

8. The wire grid security enclosure with heavy duty latch mechanism as claimed in claim 6 further comprises:

a second handle; and the second handle being medially positioned on the second hooked rod.

9. The wire grid security enclosure with heavy duty latch mechanism as claimed in claim 6 further comprises:

a first set of handle slots; and the first set of handle slots traversing into the sleeve of the first door.

10. The wire grid security enclosure with heavy duty latch mechanism as claimed in claim 6 further comprises:

a second set of handle slots; and the second set of handle slots traversing into the sleeve of the second door.

11. The wire grid security enclosure with heavy duty latch mechanism as claimed in claim 6 further comprises:

a first set of retaining tabs; and the first set of retaining tabs being terminally connected to the sleeve of the first door.

12. The wire grid security enclosure with heavy duty latch mechanism as claimed in claim 6 further comprises:

a second set of retaining tabs; and the second set of retaining tabs being terminally connected to the sleeve of the second door.

13. The wire grid security enclosure with heavy duty latch mechanism as claimed in claim 1 further comprises:

a first locking tab; and the first locking tab being positioned on the first hooked rod.

14. The wire grid security enclosure with heavy duty latch mechanism as claimed in claim 1 further comprises:

a second locking tab; and the second locking tab being positioned on the second hooked rod.

15. The wire grid security enclosure with heavy duty latch mechanism as claimed in claim 1 further comprises:

a plurality of wheels; and the plurality of wheels being removably mounted to the base mount, opposite to the lateral wall, the first door, and the second door.

16. The wire grid security enclosure with heavy duty latch mechanism as claimed in claim 1 further comprises:

a plurality of clips; and each of the plurality of clips being engaged with the lateral wall and the base mount.

* * * * *